UNITED STATES PATENT OFFICE.

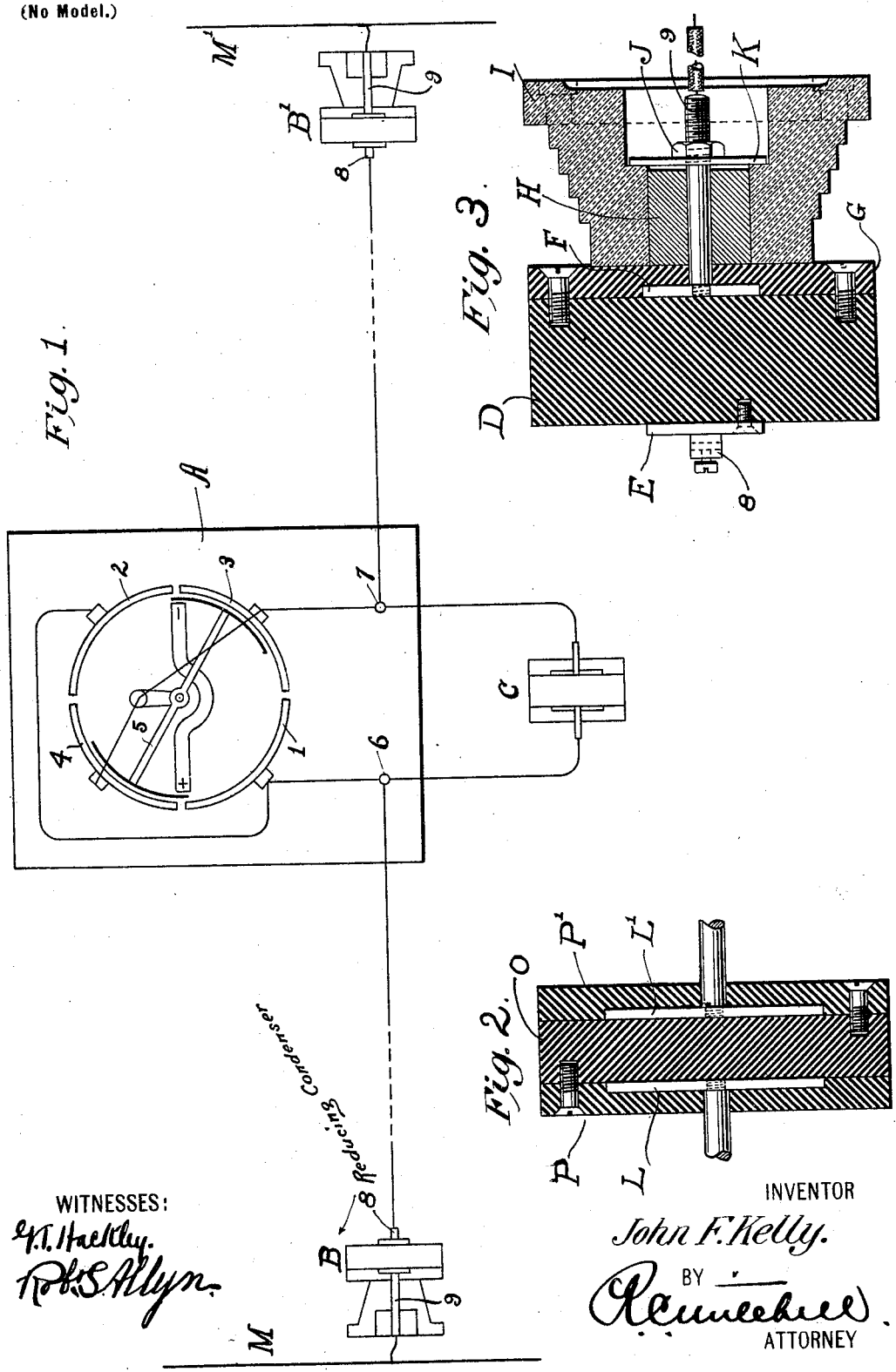

JOHN FORREST KELLY, OF PITTSFIELD, MASSACHUSETTS, ASSIGNOR OF ONE-HALF TO CUMMINGS C. CHESNEY, OF SAME PLACE.

ELECTRICAL INSTRUMENT.

SPECIFICATION forming part of Letters Patent No. 678,957, dated July 23, 1901.

Application filed April 23, 1901. Serial No. 57,042. (No model.)

*To all whom it may concern:*

Be it known that I, JOHN FORREST KELLY, a citizen of the United States, residing at Pittsfield, Berkshire county, Massachusetts, have invented certain new and useful Improvements in Electrical Instruments, of which the following is a full, clear, and exact description.

My invention relates to improvements in static or other instruments possessing capacity, and has for its object to increase the safety and effectiveness of such instruments and to render them less liable to be affected by outside influences.

The following is a description of my invention, reference being had to the accompanying drawings, in which—

Figure 1 represents my improvements as applied to a static ground-detector. Figs. 2 and 3 represent, respectively, intermediate and external condensers for the purpose hereinafter explained.

In case static instruments, such as ground-detectors, are connected across the mains directly the potentials on the parts of the instrument are the same as the potentials on the mains, with the result that there is great danger of an arc forming between two opposing portions of opposite potential, rendering necessary very strong and perfect insulation. Even if they could be sufficiently covered or embedded in insulation without interfering with the action of the apparatus the fact that the high potential was brought to them would be a cause of danger to those in charge and to other apparatus, since of necessity there would be danger of contact with high-potential circuits. I have heretofore provided two reducing-condensers, which are located between each terminal of the instrument and the mains and are located at some convenient and safe place. On account of their location and the fact that they reduce the potential the danger to persons and to other apparatus is minimized and the apparatus can be manufactured without such elaborate protection in the way of insulation and large air-gaps and other features of construction guarding against short-circuiting. In such instruments I have also found that disturbances arise from the fact that a static instrument of the class referred to is itself not only a condenser, but a condenser of variable capacity, the capacity increasing with the deflection, and since the distribution of potential is inversely proportional to the capacity the share of the potential that the instrument gets decreases as the deflection increases. Consequently the tendency to deflection is restricted, since the deflection itself reduces the share of potential which the instrument receives. Again, static capacity between different portions of the system and the ground always exists and normally in such a manner as to balance out, thus having no effect on the instrument. If, however, one of the lines becomes grounded, the capacity with reference to the ground becomes a shunt across one of the reducing-condensers and a part of the instrument, thus affecting the indication of the latter. Further, the presence of the movable vane and the variable capacity renders this action asymmetrical, so that in general a grounding of one line increases the deflection and a grounding of the other decreases it. Now I have found that by placing a condenser of comparatively large capacity in shunt to the instrument obviates both of these troubles, inasmuch as the shunting-condenser of large capacity as compared with the static instrument renders the capacity between the terminals of the instrument substantially constant and the share of potential which falls to it is also constant, and, in the second place, the introduction of this shunt-condenser permits and requires the use of series condensers of large capacity in order to bring about the proper difference of potential to the instrument, which condensers of large capacity render the shunt effect by a ground relatively insignificant.

Referring more particularly to the drawings, A represents a static instrument connected through condensers B B' to the two mains M M', so as to constitute a ground-detector. Said instrument consists of four quadrants 1, 2, 3, and 4, the opposite ones being electrically connected, and a movable needle or vane 5, which is electrically connected with one pair of quadrants, as shown. The terminals 6 and 7 of the instrument are respectively connected to the terminals 8 and 8' of the two condensers B B', whose other terminals 9 and 9' are connected to high-potential mains M M'. The terminals 6 and 7 are also connected together by a condenser C, which is thus in shunt with the instrument A.

The condensers B B' are similar in construction and are shown in detail in Fig. 3. They consist of a block of insulating material D, preferably of hard rubber or similar substance, to one side of which is attached the condenser-plate E. The other side is secured to the condenser-plate F, which is housed in a recess formed in a plate G, of hard rubber, secured thereto by screws or other suitable means. From the plate F passes an elongated terminal or binding post 9, which is surrounded by a block of insulating material H and further surrounded by a block of porcelain I. The binding-post 9 is connected to one of the high-potential mains M M', while the terminal 8 is connected with one of the conductors leading to the static instrument. This condenser is simple in construction and may be made of sufficient strength to stand almost any difference of potential. The condensers B B' are preferably located so that the high-potential currents are not brought to the neighborhood of the instrument or where they will be accessible or liable to come in contact with other conductors.

The condenser C is shown in detail in Fig. 2 and consists of two plates L L', held in contact with opposite faces of a block O of insulating material and preferably housed in insulating material P P', secured to the block O by screws or other suitable fastenings, which also serve to hold the plates L L' in position. The condenser C is large in capacity as compared with the static instrument, and therefore makes the capacity between the terminals of the instrument practically constant, and the share of potential which falls to it also constant, as above described. Furthermore, the capacity of the series condensers B B' in order to bring the proper difference of potential to the instrument must be so large as to make the shunt effect by the earth relatively insignificant. Since the condenser C in shunt to the instrument makes the capacity between the instrument's terminals substantially constant and the series condensers reduce the potential and at the same time make the shunt effect of the earth insignificant, my invention results in the production of a safe, accurate, and efficient apparatus in which defects in prior apparatus are obviated.

What I claim is—

1. In combination a device possessing static capacity with two reducing-condensers in series therewith one on each side of said device and between it and a high-potential main, said condensers being located so as to remove any danger of contact with the high-potential mains leading thereto.

2. In combination two reducing-condensers connected with high-potential mains, a device possessing variable capacity having its terminals connected to the inner condenser-terminals, a third condenser in shunt across the terminals of the device.

3. In combination two reducing-condensers connected with high-potential mains, a device possessing variable capacity having its terminals connected to the inner condenser-terminals, a third condenser in shunt across the terminals of said device, said shunting-condenser being of large capacity relatively to said device.

4. In combination a static indicating device possessing variable capacity, means for supplying an alternating difference of potential to its terminals, and a condenser in shunt across said terminals.

5. In combination a device possessing variable capacity, a condenser in shunt across its terminals and a second condenser in series with said device and first condenser, and means for supplying an alternating potential.

6. The combination of a base-block of insulating material, a condenser-plate held in contact with one face thereof, a second condenser-plate held in contact with the opposite face, and a terminal extending therefrom, said second plate and terminal being surrounded by insulating material closely embracing a considerable portion at least of said terminal.

Signed at Pittsfield, Massachusetts, this 20th day of April, 1901.

JOHN FORREST KELLY.

Witnesses:
M. L. NICHOLS,
CHARLES E. DORR.